United States Patent
Wariishi et al.

(10) Patent No.: US 6,969,564 B2
(45) Date of Patent: Nov. 29, 2005

(54) FUEL CELL STACK

(75) Inventors: Yoshinori Wariishi, Utsunomiya (JP);
Narutoshi Sugita, Utsunomiya (JP);
Masaharu Suzuki, Utsunomiya (JP);
Seiji Sugiura, Utsunomiya (JP);
Daisuke Wachi, Shioya-gun (JP);
Yosuke Fujii, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 417 days.

(21) Appl. No.: 10/242,119

(22) Filed: Sep. 12, 2002

(65) Prior Publication Data

US 2003/0049515 A1    Mar. 13, 2003

(30) Foreign Application Priority Data

Sep. 13, 2001 (JP) ............................. 2001-278238

(51) Int. Cl.[7] ............................. H01M 8/02; H01M 8/04
(52) U.S. Cl. ........................................ 429/38; 429/39
(58) Field of Search ............................. 429/26, 30, 38, 429/39

(56) References Cited

FOREIGN PATENT DOCUMENTS

| EP | 971428 A2 | * | 1/2000 | .......... H01M 8/04 |
|---|---|---|---|---|
| JP | 07263003 A | * | 10/1995 | .......... H01M 8/02 |
| JP | 10284095 A | * | 10/1998 | .......... H01M 8/02 |
| JP | 2000090947 A | * | 3/2000 | .......... H01M 8/02 |

\* cited by examiner

*Primary Examiner*—Gregg Cantelmo
(74) *Attorney, Agent, or Firm*—Lahive & Cockfield, LLP; Anthony A. Laurentano, Esq.

(57) ABSTRACT

A cell assembly has reactant gas passages connected in series in first and second unit cells, and oxygen-containing gas inlets, intermediate oxygen-containing gas inlets, oxygen-containing gas outlets, intermediate oxygen-containing gas outlets which are defined in the first and second unit cells. The oxygen-containing gas inlets and the intermediate oxygen-containing gas inlets are disposed upwardly of the oxygen-containing gas outlets and the intermediate oxygen-containing gas outlets. The oxygen-containing gas outlets and the intermediate oxygen-containing gas outlets are disposed at least partly below electric energy generating surfaces of the first and second unit cells.

6 Claims, 8 Drawing Sheets

FUEL CELL STACK

BACKGROUND OF THE INVENTION

1. Field of the Invention

The present invention relates to a fuel cell stack comprising a cell assembly of unit cells each having a membrane electrode assembly which comprises an anode, a cathode, and a solid polymer ion exchange membrane sandwiched between the anode and the cathode.

2. Description of the Related Art

Usually, solid polymer electrolyte fuel cells employ an ion exchange membrane (solid polymer ion exchange membrane) comprising a polymer ion exchange membrane (proton exchange membrane). A membrane electrode assembly comprises an anode and a cathode, each made up of an electrode catalyst and a porous carbon panel, that are disposed on the opposite sides of the ion exchange membrane. The membrane electrode assembly is sandwiched between separators (bipolar plates), making up a unit cell for generating electricity. A predetermined number of such unit cells are stacked for use as a fuel cell stack.

When a fuel gas, e.g., a gas mainly containing hydrogen (hereinafter referred to as "hydrogen-containing gas") is supplied to the anode, the hydrogen in the gas is ionized on the electrode catalyst and moves through the ion exchange membrane to the cathode. Electrons are supplied to an external circuit, which uses the electrons as an electric energy of a direct current. Since the cathode is supplied with a gas mainly containing oxygen (hereinafter referred to as "oxygen-containing gas"), for example, hydrogen ions, electrons, and oxygen react with each other on the cathode, producing water.

In the fuel cell stack, moisture contained in reactant gases, i.e., the fuel gas and the oxygen-containing gas, is occasionally condensed in each unit cell under some operating conditions including the flow rate, humidity, and temperature of those reactant gases. If the condensation occurs within reactant gas passages in the unit cells and within the membrane electrode assembly, then it tends to obstruct the supply of reactant gases and the discharge of the produced water, thereby increasing the concentration overvpotential and lowering the electric energy generating capability.

In particular, there has not been developed an effective technique of discharging condensed water from each of the unit cells of the cell assembly of a fuel cell stack. It has thus been desirous of increasing the ability to discharge the condensed water from those unit cells.

SUMMARY OF THE INVENTION

It is a main object of the present invention to provide a fuel cell stack having a cell assembly which is capable of effectively discharging condensed water from each unit cell to effectively increase the electric energy generating capability of each unit cell.

According to the present invention, a fuel cell stack includes a cell assembly comprising a stack of unit cells. The cell assembly has a plurality of reactant gas passages connected in series in the unit cells, respectively, for passing a reactant gas, which is at least one of a fuel gas and an oxygen gas, along electric energy generating surfaces of the unit cells, a plurality of reactant gas inlets defined in the unit cells, respectively, for supplying the reactant gas to the reactant gas passages, and a plurality of reactant gas outlets defined in the unit cells, respectively, for discharging the reactant gas from the reactant gas passages, the reactant gas inlets being disposed upwardly of the reactant gas outlets, the reactant gas outlets being disposed at least partly below the electric energy generating surfaces of the unit cells.

Intermediate communication holes provide communication between the reactant gas passage in an upstream one of the unit cells and the reactant gas passage in a downstream one of the unit cells. The intermediate communication holes include intermediate reactant gas outlets for discharging the reactant gas from the reactant gas passage in the upstream unit cell and intermediate reactant gas inlets for supplying the reactant gas to the reactant gas passage in the downstream unit cell. The intermediate reactant gas outlets are disposed below the intermediate reactant gas inlets and disposed at least partly below the electric energy generating surfaces of the unit cells.

Specifically, the reactant gas inlets and the intermediate reactant gas outlets are disposed in diagonally opposite positions on the unit cells which are rectangular in shape, and the intermediate reactant gas inlets and the reactant gas outlets are disposed in other diagonally opposite positions on the rectangular unit cells, the reactant gas outlets and the intermediate reactant gas outlets being disposed at least partly below the electric energy generating surfaces of the unit cells.

As described above, in all the unit cells, the reactant gas inlets (including the intermediate reactant gas inlets) are positioned upwardly of the reactant gas outlets (including the intermediate reactant gas outlets), and the reactant gas outlets are disposed at least partly below the electric energy generating surfaces of the unit cells. With this structure, condensed water is reliably discharged by gravity from the electric energy generating surfaces of the unit cells. The electric energy generating capability of each of the unit cells is thus effectively increased with a simple arrangement.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
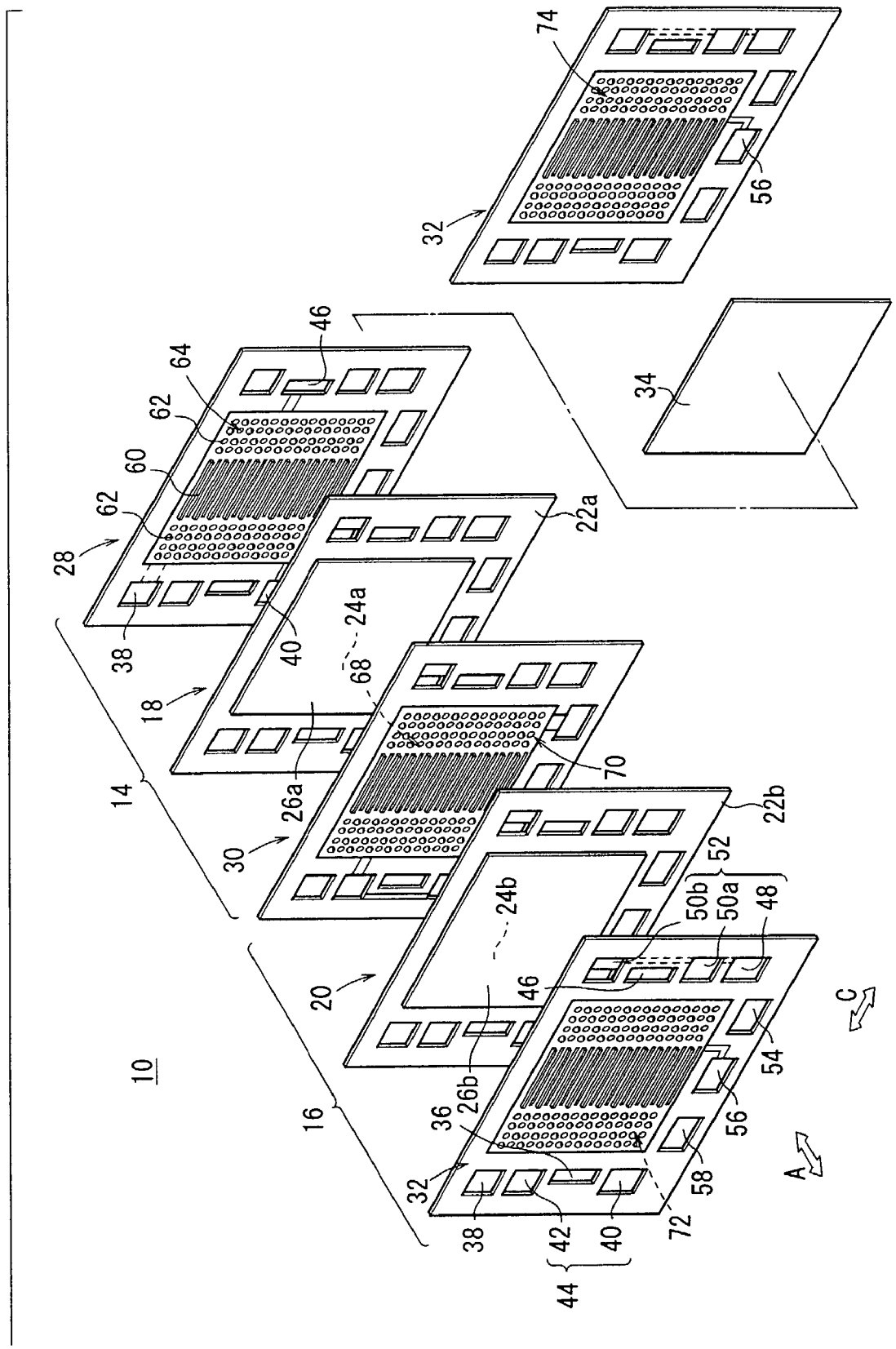
FIG. 1 is an exploded perspective view of a portion of a cell assembly of a fuel cell stack according to the present invention.
Figure 2:
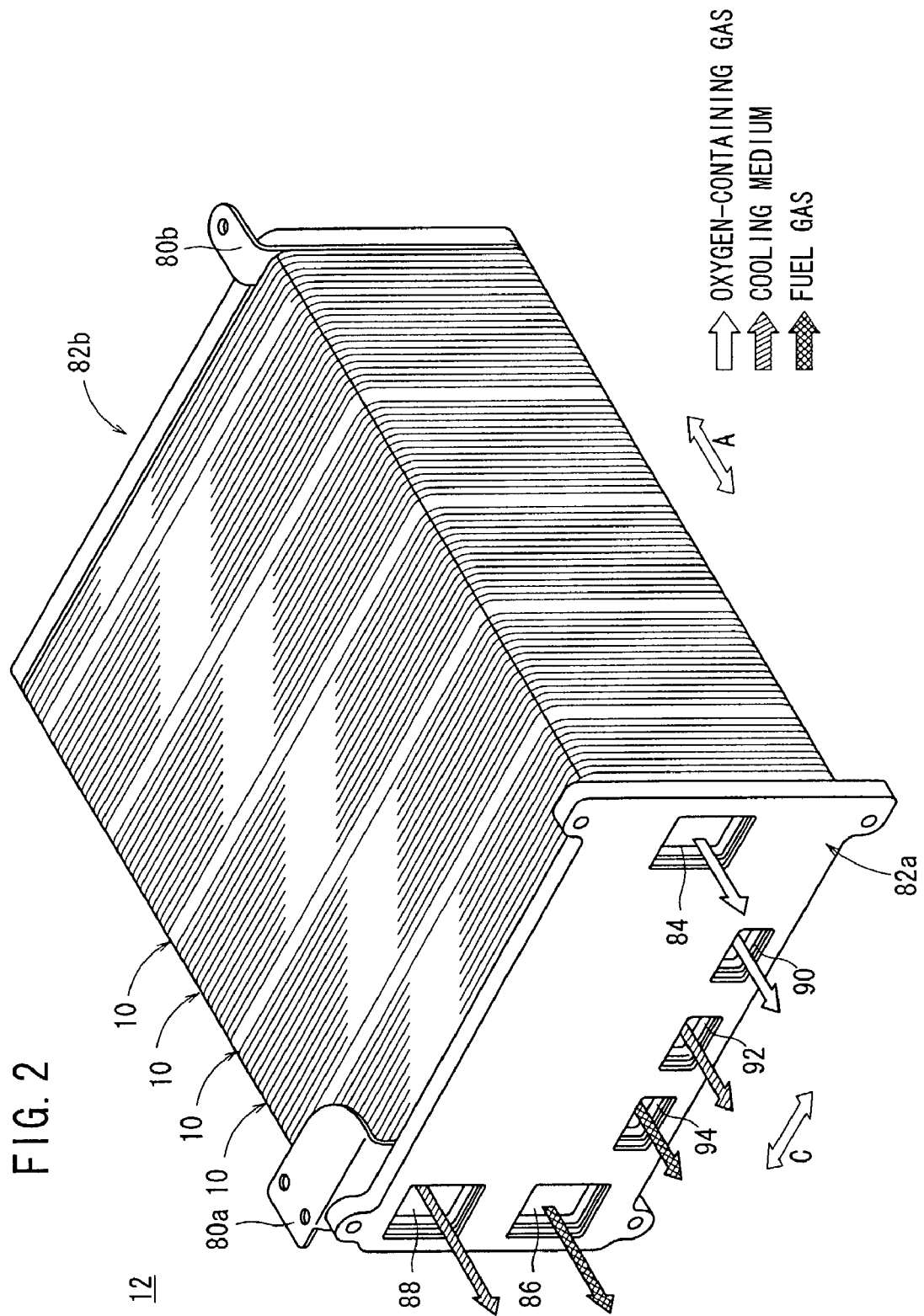
FIG. 2 is a perspective view of the fuel cell stack according to the present invention.

FIG. 1 shows in exploded perspective a portion of a cell assembly 10 of a fuel cell stack 12 according to the present invention, and FIG. 2 shows in perspective view the fuel cell stack 12 which comprises a stack of cell assemblies 10.

As shown in FIG. 1, the cell assembly 10 comprises a first unit cell 14 and a second unit cell 16 which are stacked one on the other. The first and second unit cells 14, 16 have first and second membrane electrode assemblies 18, 20, respectively. The first and second unit cells 14, 16 are rectangular in shape and are stacked horizontally such that their electric energy generating surfaces lie in a vertical direction.

The first and second membrane electrode assemblies 18, 20 have respective solid polymer ion exchange membranes 22a, 22b, and respective cathodes 24a, 24b and respective anodes 26a, 26b which are disposed in sandwiching relation to the solid polymer ion exchange membranes 22a, 22b. Each of the cathodes 24a, 24b and the anodes 26a, 26b is made up of an electrode catalyst and porous carbon paper.

Figure 3:
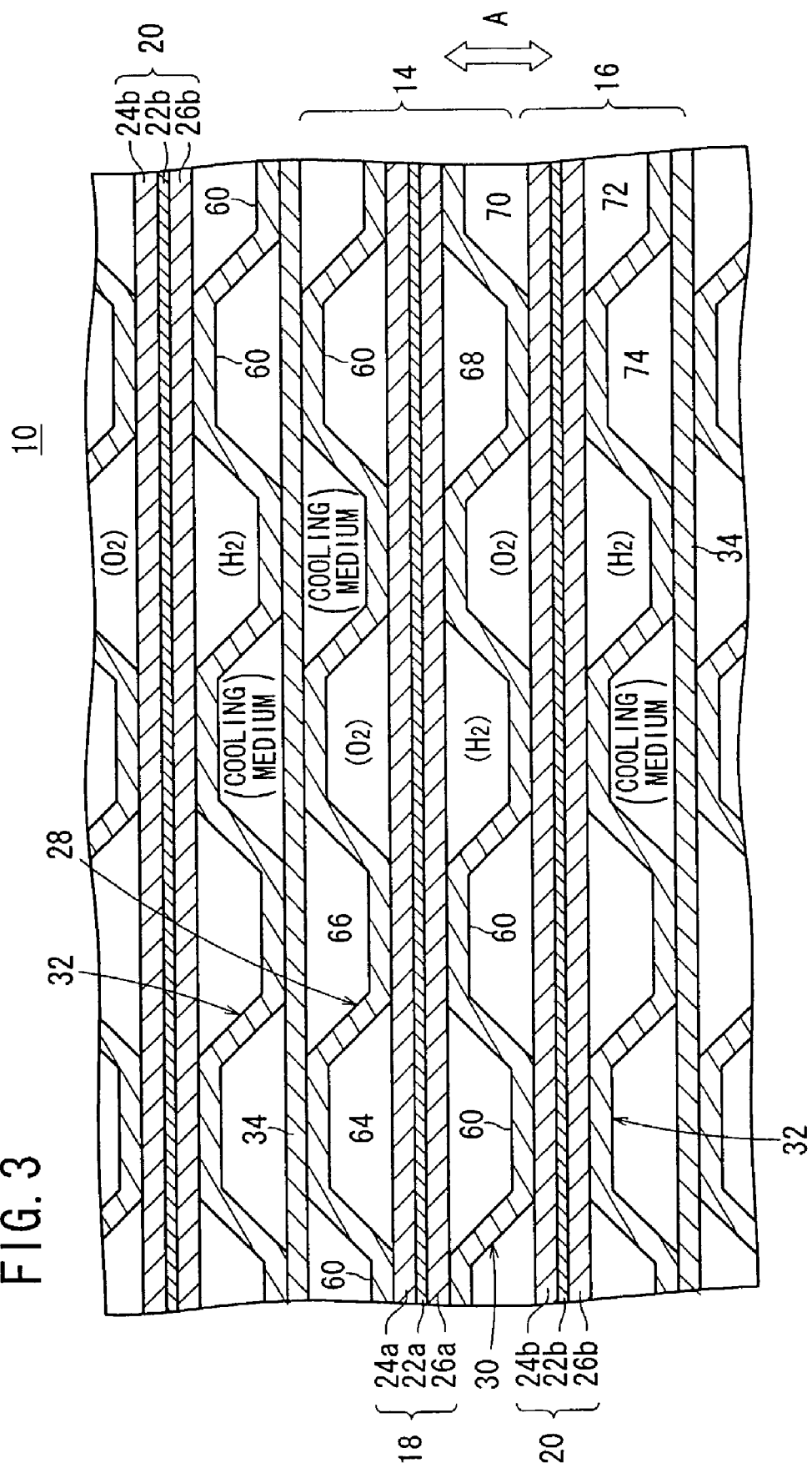
FIG. 3 is a fragmentary cross-sectional view of the cell assembly.

As shown in FIGS. 1 and 3, a first separator 28 is disposed on one side of the first membrane electrode assembly 18 where the cathode 24a is provided. A second separator 30 is disposed between the other side of the first membrane electrode assembly 18 where the anode 26a is provided and one side of the second membrane electrode assembly 20 where the cathode 24b is provided. A third separator 32 is disposed between the other side of the second membrane electrode assembly 20 where the anode 26b is provided. Thin wall panels (partition walls) 34 are disposed in facing relation to the outer surfaces of the first and third separators 28, 32.

As shown in FIG. 1, the first and second membrane electrode assemblies 18, 20 and the first through third separators 28, 30, 32 have, defined in one longitudinal end thereof in the direction indicated by the arrow C, respective fuel gas inlets 36 communicating with each other in the direction indicated by the arrow A in which the first and second unit cells 14, 16 are stacked, for passing a fuel gas (reactant gas) such as a hydrogen-containing gas therethrough, respective cooling medium outlets 38 communicating with each other in the direction indicated by the arrow A, for passing a cooling medium therethrough, respective intermediate oxygen-containing gas outlets 40 communicating with each other in the direction indicated by the arrow A, for discharging an oxygen-containing gas (reactant gas) such as air which has been supplied to the reaction in the first unit cell 14 that is located upstream with respect to the flow of the gas, and respective intermediate oxygen-containing gas inlets 42 communicating with each other in the direction indicated by the arrow A and also communicating with the intermediate oxygen-containing gas outlets 40, for introducing the oxygen-containing gas into the second unit cell 16 that is located downstream with respect to the flow of the gas. The intermediate oxygen-containing gas outlets 40 and the intermediate oxygen-containing gas inlets 42 jointly make up intermediate oxygen-containing gas communication holes (intermediate communication holes) 44.

The first and second membrane electrode assemblies 18, 20 and the first through third separators 28, 30, 32 have, defined in the other longitudinal end thereof, respective oxygen-containing gas inlets 46 communicating with each other in the direction indicated by the arrow A, respective intermediate fuel gas outlets 48 communicating with each other in the direction indicated by the arrow A, for discharging a fuel gas which has been supplied to the reaction in the first unit cell 14, and respective first and second intermediate fuel gas inlets 50a, 50b communicating with each other in the direction indicated by the arrow A and also communicating with the intermediate fuel gas outlets 48, for introducing the fuel gas into the second unit cell 16. The intermediate fuel gas outlets 48 and the first and second intermediate fuel gas inlets 50a, 50b jointly make up intermediate fuel gas communication holes (intermediate communication holes) 52.

The first and second membrane electrode assemblies 18, 20 and the first through third separators 28, 30, 32 also have, defined in a lower edge thereof, respective oxygen-containing gas outlets 54 communicating with each other in the direction indicated by the arrow A, respective cooling medium inlets 56 communicating with each other in the direction indicated by the arrow A, and respective fuel gas outlets 58 communicating with each other in the direction indicated by the arrow A.

Figure 4:
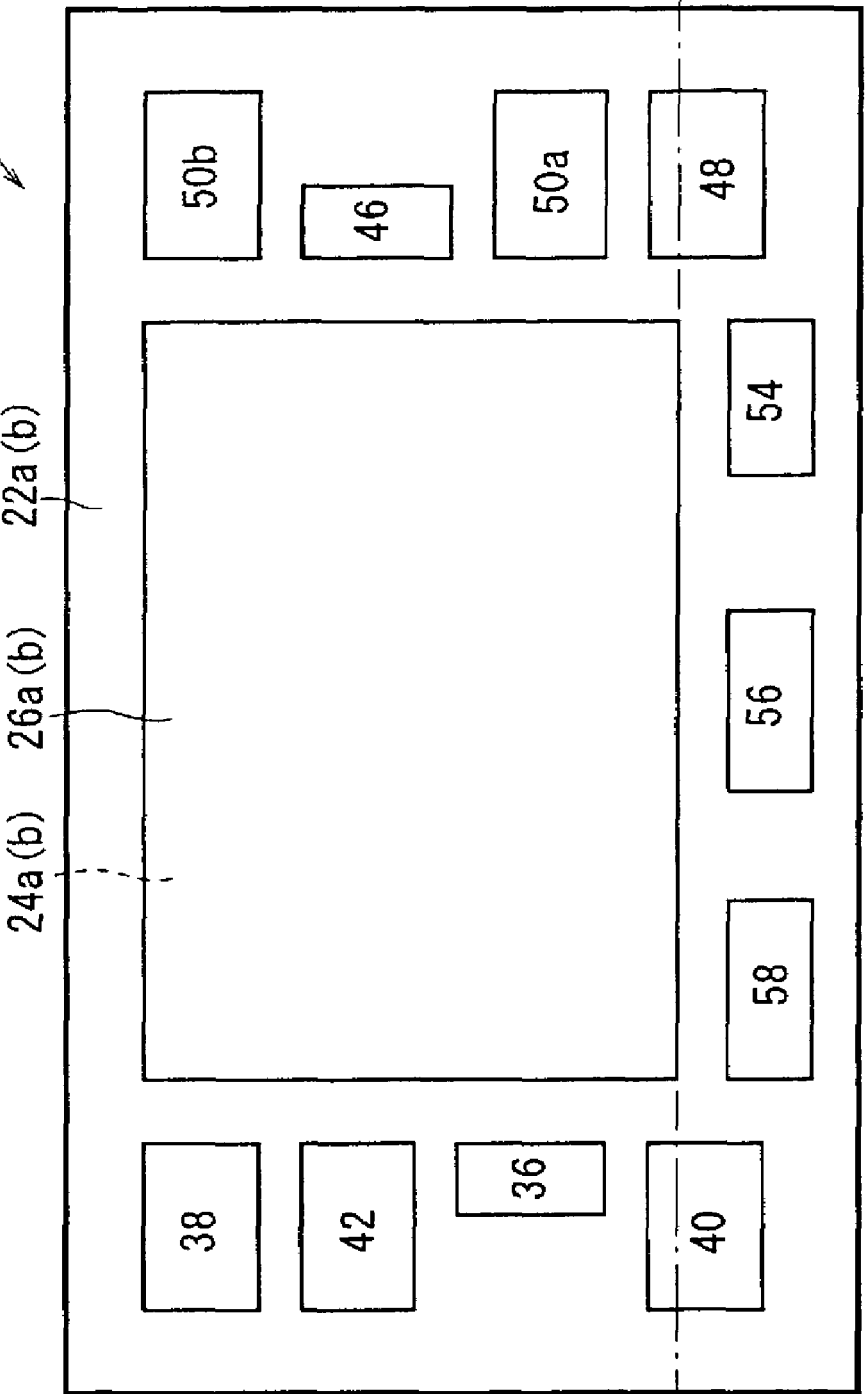
FIG. 4 is a front elevational view of first and second membrane electrode assemblies of the cell assembly.

As shown in FIG. 4, in each of the first and second membrane electrode assemblies 18, 20 and the first through third separators 28, 30, 32, the fuel gas inlets 36 and the first and second intermediate fuel gas inlets 50a, 50b are disposed upwardly of the fuel gas outlets 58 and the intermediate fuel gas outlets 48, and the oxygen-containing gas inlets 46 and the intermediate oxygen-containing gas inlets 42 are disposed upwardly of the oxygen-containing gas outlets 54 and the intermediate oxygen-containing gas outlets 40. The intermediate oxygen-containing gas outlets 40, the intermediate fuel gas outlets 48, the oxygen-containing gas outlets 54, and the fuel gas outlets 58 are disposed at least partly below the position P of the lower end of the electric energy generating surfaces of the cathodes 24a, 24b and the anodes 26a, 26b.

As shown in FIG. 1, the first separator 28, which is a thin metal sheet, has a plurality of straight grooves 60 defined centrally therein and extending a given length in the direction C (longitudinal direction), and a pair of embossed regions 62 disposed at respective opposite ends of the straight grooves 60 in the direction C and serving as buffer spaces. The straight grooves 60 and the embossed regions 62 are defined alternately in the opposite surfaces of the first separator 28. The straight grooves 60 and the embossed regions 62 which are defined in the surface of the first separator 28 which faces the cathode 24a of the first membrane electrode assembly 18 jointly provide an oxygen-containing gas passage (reactant gas passage) 64 (see FIGS. 3 and 5) which has its opposite ends communicating respectively with the oxygen-containing gas inlet 46 and the intermediate oxygen-containing gas outlet 40 defined in the first separator 28.

The straight grooves 60 and the embossed regions 62 which are defined in the other surface of the first separator 28 which faces one of the surfaces of the wall panel 34 jointly provide a cooling medium passage 66 (see FIGS. 3 and 5) which has an end communicating with the cooling medium outlet 38 defined in the first separator 28 and the other end turning around an end of the wall panel 34 and communicating with the cooling medium inlet 56 in an adjacent third separator 32 on the other surface of the wall panel 34.

Figure 6:
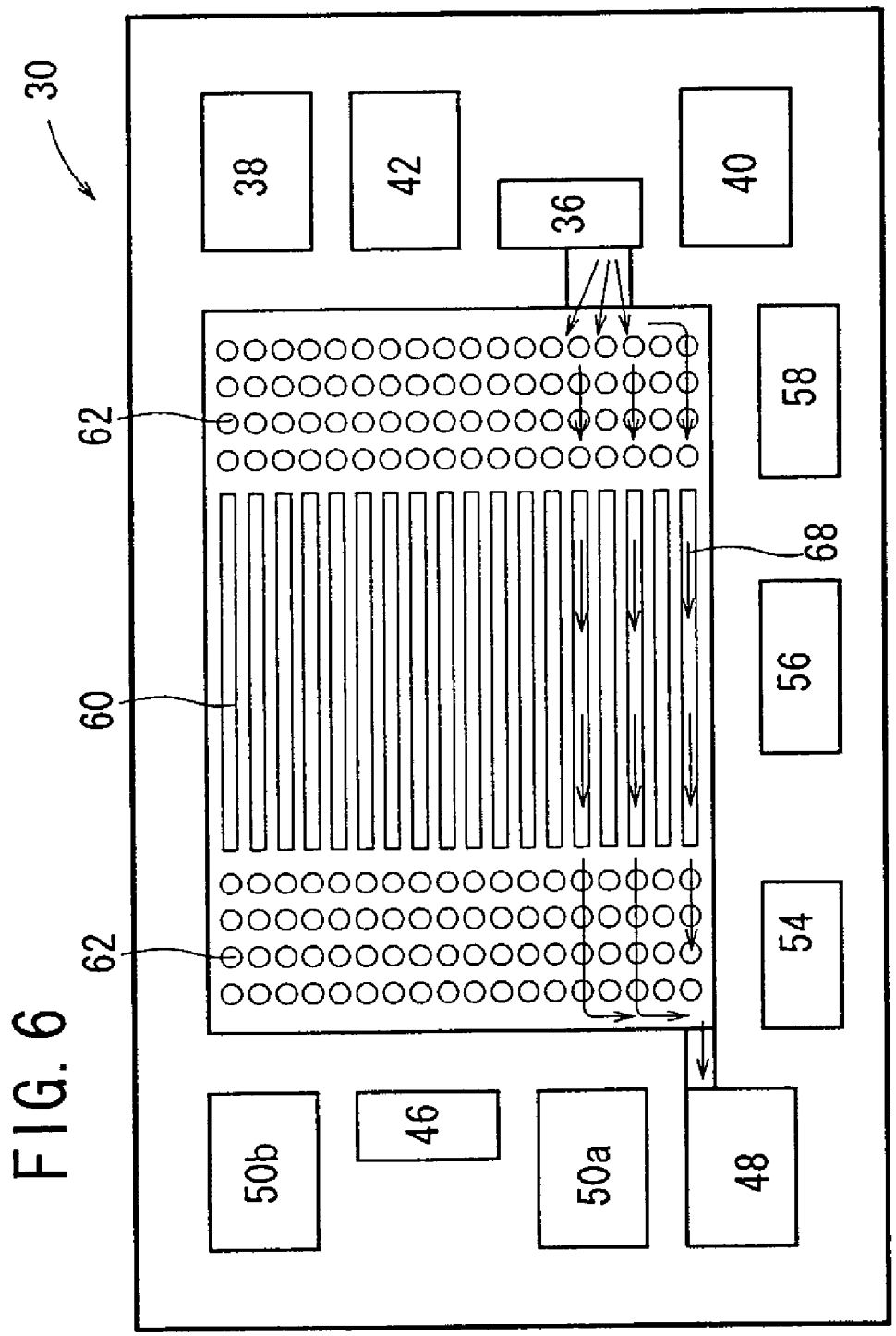
FIG. 6 is a front elevational view of a fuel cell gas passage side of a second separator of the cell assembly.
Figure 7:
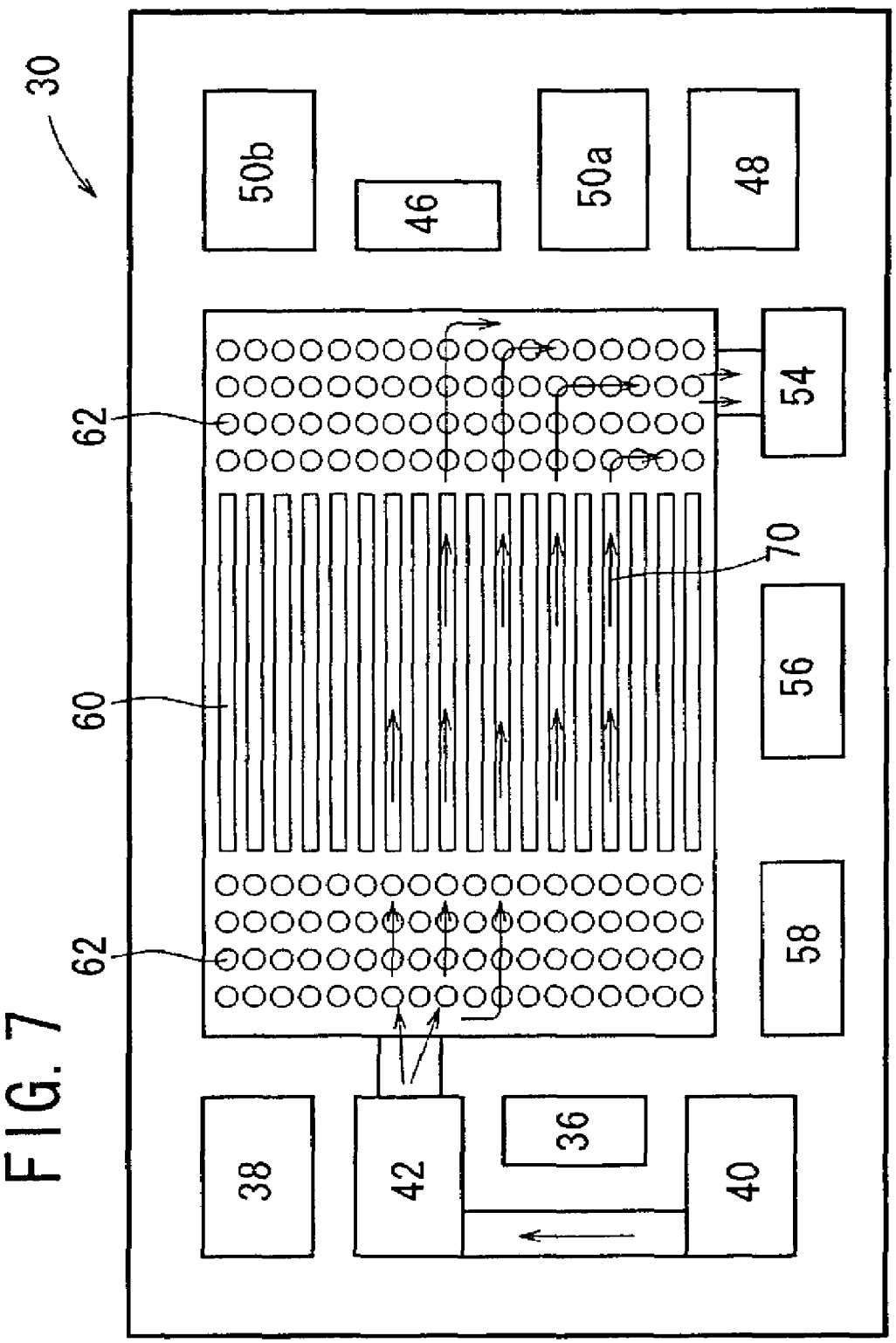
FIG. 7 is a front elevational view of an oxygen-containing gas passage side of the second separator.

The second separator 30 is substantially identical in structure to the first separator 28. The second separator 30 has a fuel gas passage (reactant gas passage) 68 comprising straight grooves 60 and embossed regions 62 which are defined in the surface of the second separator 30 which faces the anode 26a of the first membrane electrode assembly 18. The fuel gas passage 68 communicates with the fuel gas inlet 36 and the intermediate fuel gas outlet 48 defined in the second separator 30 (see FIG. 6). As shown in FIG. 7, the second separator 30 has an oxygen-containing gas passage (reactant gas passage) 70 defined in the surface of the second separator 30 which faces the cathode 24b of the second membrane electrode assembly 20. The oxygen-containing gas passage 70 has an end communicating with the intermediate oxygen-containing gas outlet 40 through the intermediate oxygen-containing gas inlet 42 and the other end communicating with the oxygen-containing gas outlet 54.

Figure 5:
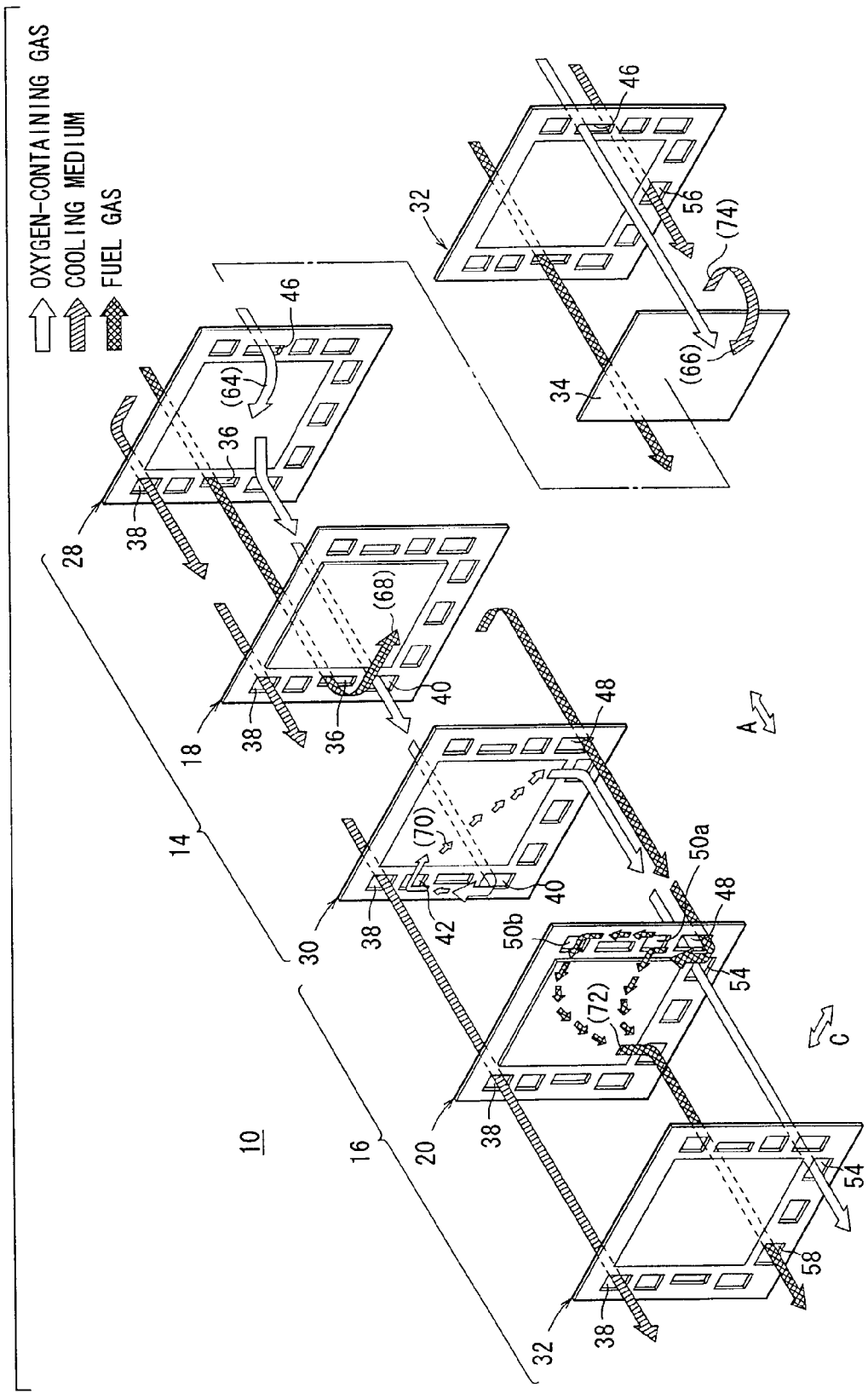
FIG. 5 is an exploded perspective view showing flows of an oxygen-containing gas, a fuel gas, and a cooling medium in the cell assembly.
Figure 8:
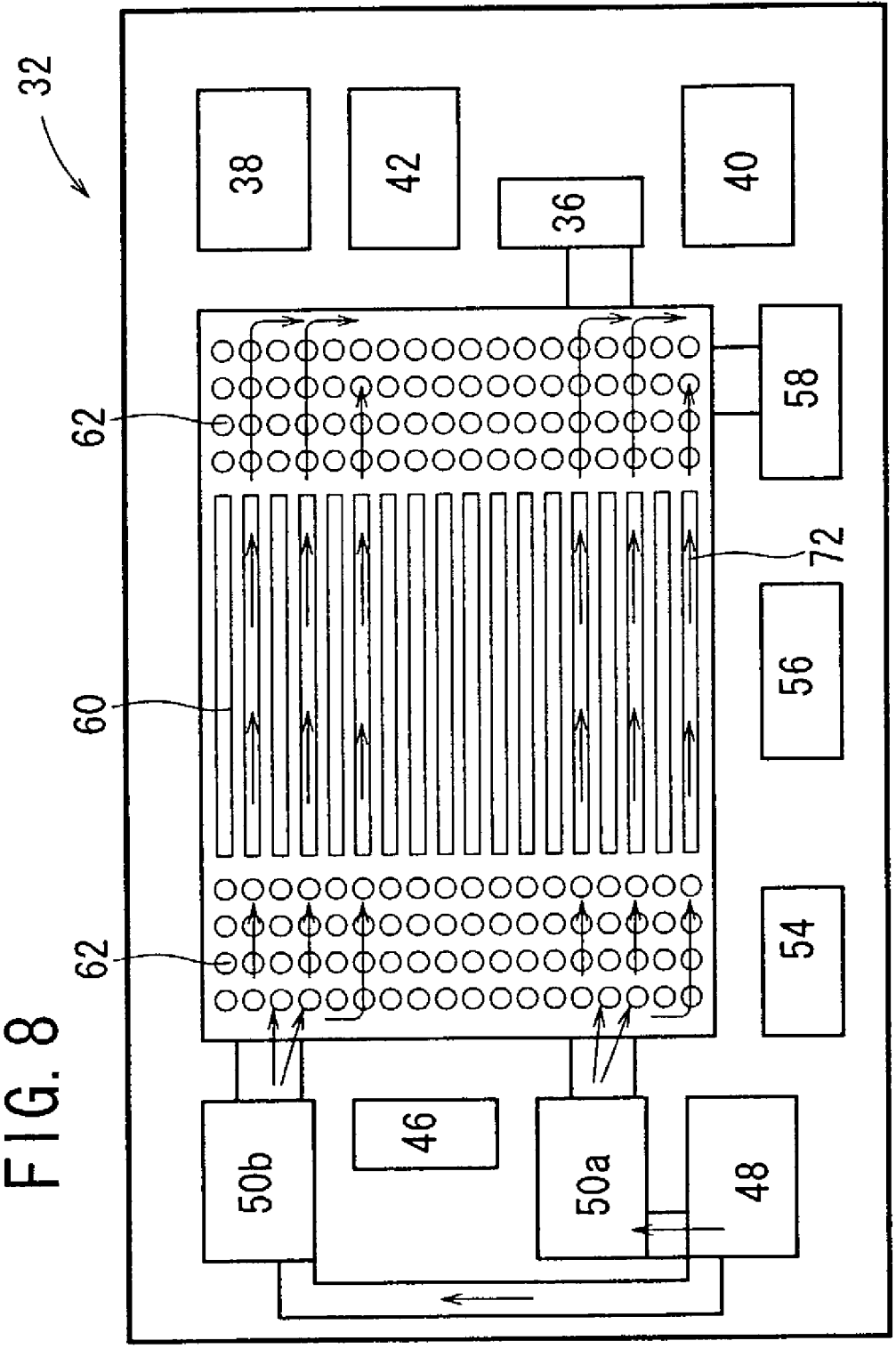
FIG. 8 is a front elevational view of a fuel cell gas passage side of a third separator of the cell assembly.

The third separator 32 is substantially identical in structure to the first and second separators 28, 30. The third separator 32 has a fuel gas passage (reactant gas passage) 72 defined in the surface of the third separator 32 which faces the anode 26*b* of the second membrane electrode assembly 20 (see FIGS. 3 and 5). As shown in FIG. 8, the fuel gas passage 72 has an end communicating with the intermediate fuel gas outlet 48 through the first and second intermediate fuel gas inlets 50*a*, 50*b*, and the other end communicating with the fuel gas outlet 58. The third separator 32 has a cooling medium passage 74 defined in the surface thereof which faces the wall panel 34. As shown in FIG. 5, the cooling medium passage 74 has an end communicating with the cooling medium inlet 56 and the other end turning around an end of the wall panel 34 and held in communication with the cooling medium outlet 38.

The cell assembly 10 thus constructed is held together as a unit by a fastening means (not shown). A certain number of cell assemblies 10 are then stacked together in the direction A. As shown in FIG. 2, end plates 82*a*, 82*b* are mounted on the respective ends of the stack of cell assemblies 10 with respective current collectors 80*a*, 80*b* interposed between the end plates 82*a*, 82*b* and the stack of cell assemblies 10. The end plates 82*a*, 82*b* are fastened to each other by tie rods or the like (not shown), thereby making up the fuel cell stack 12.

The end plates 82*a*, 82*b* have respective oxygen-containing gas supply ports 84 defined in one longitudinal end thereof and communicating with the oxygen-containing gas inlets 46. The end plates 82*a*, 82*b* also have respective fuel gas supply ports 86 defined in the other longitudinal end thereof and communicating with the fuel gas inlets 36 and respective cooling medium discharge ports 88 defined in the other longitudinal end thereof and communicating with the cooling medium outlets 38. The end plates 82*a*, 82*b* have, defined in a lower edge thereof, respective oxygen-containing gas discharge ports 90, cooling medium supply ports 92, and fuel gas discharge ports 94 which are held in communication with the oxygen-containing gas outlets 54, the cooling medium inlets 56, and the fuel gas outlets 58, respectively.

Operation of the fuel cell stack 12 thus constructed will be described below.

The fuel cell stack 12 is supplied with a fuel gas such as a hydrogen-containing gas or the like from the fuel gas supply port 86, an oxygen-containing gas such as air or the like from the oxygen-containing gas supply port 84, and a cooling medium such as pure water, ethylene glycol, or the like from the cooling medium supply port 92. In the fuel cell stack 12, the cell assemblies 10 stacked in the direction A are successively supplied with the fuel gas, the oxygen-containing gas, and the cooling medium.

As shown in FIGS. 3 and 5, the oxygen-containing gas is supplied to the oxygen-containing gas inlet 46 and introduced into the oxygen-containing gas passage 64 in the first separator 28 where it moves along the cathode 24*a* of the first membrane electrode assembly 18. As shown in FIG. 6, the fuel gas is supplied to the fuel gas inlet 36 and introduced into the fuel gas passage 68 in the second separator 30 where it moves along the anode 26*a* of the first membrane electrode assembly 18. In the first membrane electrode assembly 18, therefore, the oxygen-containing gas supplied to the cathode 24*a* and the fuel gas supplied to the anode 26*a* are consumed by an electrochemical reaction in the electrode catalyst, generating electric energy.

The oxygen-containing gas, which has partly been consumed by the first membrane electrode assembly 18, is introduced from the oxygen-containing gas passage 64 into the intermediate oxygen-containing gas outlet 40 of the intermediate oxygen-containing gas communication hole 44, and moves in the direction A along the intermediate oxygen-containing gas outlet 40. As shown in FIG. 7, the oxygen-containing gas is introduced from the intermediate oxygen-containing gas inlet 42 into the oxygen-containing gas passage 70 in the second separator 30, and moves through the oxygen-containing gas passage 70 along the cathode 24*b* of the second membrane electrode assembly 20.

Similarly, the fuel gas, which has partly been consumed by the anode 26*a* of the first membrane electrode assembly 18, is introduced into the intermediate fuel gas outlet 48 of the intermediate fuel gas communication hole 52 and moves in the direction A, as shown in FIG. 5. The fuel gas is then introduced into the fuel gas passage 72 in the third separator 32 through the first and second intermediate fuel gas inlets 50*a*, 50*b* (see FIG. 8).

Since the fuel gas moves along the anode 26*b* of the second membrane electrode assembly 20, the oxygen-containing gas and the fuel gas are consumed by an electrochemical reaction in the electrode catalyst of the second membrane electrode assembly 20, generating electric energy. The oxygen-containing gas, whose oxygen has been consumed, is discharged into the oxygen-containing gas outlet 54, and the fuel gas, whose hydrogen has been consumed, is discharged into the fuel gas outlet 58 (see FIG. 5).

The cooling medium is supplied to the cooling medium inlet 56 and moves along the cooling medium passage 74 in the third separator 32. Then, the cooling medium flows back around the wall panel 34, moves along the cooling medium passage 66 in the first separator 28, and is discharged into the cooling medium outlet 38.

According to the present embodiment, as shown in FIG. 4, the fuel gas inlets 36 and the first and second intermediate fuel gas inlets 50*a*, 50*b* are disposed upwardly of the fuel gas outlets 58 and the intermediate fuel gas outlets 48, i.e., in an upper portion of the electric energy generating surface, and the oxygen-containing gas inlets 46 and the intermediate oxygen-containing gas inlets 42 are disposed upwardly of the oxygen-containing gas outlets 54 and the intermediate oxygen-containing gas outlets 40. Furthermore, the intermediate oxygen-containing gas outlets 40, the intermediate fuel gas outlets 48, the oxygen-containing gas outlets 54, and the fuel gas outlets 58 are disposed at least partly below the position P of the lower end of the electric energy generating surfaces of the cathodes 24*a*, 24*b* and the anodes 26*a*, 26*b*.

Therefore, even when moisture contained in the fuel gas and the oxygen-containing gas, is condensed in the cell assemblies 10 under some operating conditions including the flow rate, humidity, and temperature of the fuel gas and the oxygen-containing gas, the condensed water is reliably discharged from all the electric energy generating surfaces.

Moisture contained in the oxygen-containing gas, for example, will be described below. The oxygen-containing gas is introduced into the oxygen-containing gas passage 64 in the first separator 28, moves along the cathode 24*a*, and thereafter is discharged into the intermediate oxygen-containing gas outlet 40 (see FIG. 5). Because the lower portion of the intermediate oxygen-containing gas outlet 40 is located below the position P of the lower end of the electric energy generating surface of the cathode 24a, condensed water produced on the electric energy generating surface of the cathode 24a is reliably and smoothly discharged by gravity into the intermediate oxygen-containing gas outlet 40.

Then, the oxygen-containing gas discharged into the intermediate oxygen-containing gas outlet 40 moves upwardly between the second separator 30 and the second membrane electrode assembly 20, flows into the intermediate oxygen-containing gas inlet 42, and thereafter is introduced from the intermediate oxygen-containing gas inlet 42 into the oxygen-containing gas passage 70 in the second separator 30 (see FIGS. 5 and 7). Even when moisture is condensed in the intermediate oxygen-containing gas inlet 42, the condensed water is discharged by gravity into the intermediate oxygen-containing gas outlet 40.

The oxygen-containing gas introduced into the oxygen-containing gas passage 70 moves along the cathode 24b, and is discharged into the oxygen-containing gas outlet 54 which is disposed below the position P of the lower end of the electric energy generating surface of the cathode 24b. Accordingly, condensed water is easily and reliably discharged by gravity from the electric energy generating surface of the cathode 24b into the oxygen-containing gas outlet 54.

In the cell assembly 10 in which the oxygen-containing gas is supplied successively to the first and second unit cells 14, 16, condensed water is reliably discharged by gravity from the electric energy generating surfaces of the first and second unit cells 14, 16. Consequently, the overall electric energy generating capability of the cell assembly 10 is effectively increased with a simple arrangement.

While moisture contained in the oxygen-containing gas has been described above, moisture contained in the fuel gas is also easily and reliably discharged in the same manner as described above.

In all the unit cells of the cell assemblies of the fuel cell stack according to the present invention, the reactant gas inlets are disposed upwardly of the reactant gas outlets, and at least a portion of the reactant gas outlets is disposed below the electric energy generating surfaces of the unit cells. Consequently, condensed water is reliably discharged by gravity from the electric energy generating surfaces, and the electric energy generating capability of each unit cell is effectively increased with a simple arrangement.

Although a certain preferred embodiment of the present invention has been shown and described in detail, it should be understood that various changes and modifications may be made therein without departing from the scope of the appended claims.

What is claimed is:

1. A fuel cell stack comprising a cell assembly comprising a stack of unit cells each having a membrane electrode assembly which comprises an anode, a cathode, and a solid polymer ion exchange membrane sandwiched between the anode and the cathode, said cell assembly having:
   a plurality of reactant gas passages connected in series in the unit cells each passing a reactant gas, which is one of a fuel gas and an oxygen gas, along electric energy generating surfaces of said unit cells;
   a plurality of reactant gas inlets defined in the unit cells, respectively, for supplying said reactant gas to said reactant gas passages; and
   a plurality of reactant gas outlets defined in the unit cells, respectively, for discharging said reactant gas from said reactant gas passages;
   said reactant gas inlets being disposed upwardly of said reactant gas outlets, said reactant gas outlets being disposed at least partly below said electric energy generating surfaces of said unit cells,
   wherein said cell assembly has intermediate communication holes providing communication between the reactant gas passage in an upstream unit cell of the unit cells and the reactant gas passage in a downstream unit cell of the unit cells, said intermediate communication holes including intermediate reactant gas outlets for discharging the reactant gas from the reactant gas passage in the upstream unit cell and intermediate reactant gas inlets for supplying the reactant gas to the reactant gas passage in the downstream unit cell, said intermediate reactant gas outlets being disposed below said intermediate reactant gas inlets and disposed at least partly below said electric energy generating surfaces of said unit cells.

2. A fuel cell stack according to claim 1, wherein said reactant gas inlets, said reactant gas outlets, said intermediate reactant gas outlets, and said intermediate reactant gas inlets are defined through said unit cells in the stacking direction of said unit cells.

3. A fuel cell stack according to claim 2, wherein said cell assembly has:
   a plurality of cooling medium passages for passing a cooling medium for cooling said unit cells along the electric energy generating surfaces of said unit cells;
   a plurality of cooling medium inlets defined in the unit cells, respectively, for supplying said cooling medium to said cooling medium passages; and
   a plurality of cooling medium outlets defined in the unit cells, respectively, for discharging said cooling medium from said cooling medium passages;
   said cooling medium inlets and said cooling medium outlets being defined through said unit cells in the stacking direction of said unit cells.

4. A fuel cell stack comprising a cell assembly comprising a stack of rectangular unit cells each having a membrane electrode assembly which comprises an anode, a cathode, and a solid polymer ion exchange membrane sandwiched between the anode and the cathode, said cell assembly having;
   a plurality of reactant gas passages connected in series in the unit cells each passing a reactant gas, which is one of a fuel gas and an oxygen gas, along electric energy generating surfaces of said unit cells;
   a plurality of reactant gas inlets defined in the unit cells, respectively, for supplying said reactant gas to said reactant gas passages;
   a plurality of reactant gas outlets defined in the unit cells, respectively, for discharging said reactant gas from said reactant gas passages;
   a plurality of intermediate communication holes providing communication between the reactant gas passage in an upstream unit cell of the unit cells and the reactant gas passage in a downstream unit cell of the unit cells;
   said intermediate communication holes including intermediate reactant gas outlets for discharging the reactant gas from the reactant gas passage in the upstream unit cell and intermediate reactant gas inlets for supplying the reactant gas to the reactant gas passage in the downstream unit cell;
   said reactant gas inlets and said intermediate reactant gas outlets being disposed in diagonally opposite positions on said rectangular unit cells, said intermediate reactant gas inlets and said reactant gas outlets being disposed in other diagonally opposite positions on said rectangular unit cells, said reactant gas outlets and said intermediate reactant gas outlets being disposed at least partly below said electric energy generating surfaces of said unit cells.

5. A fuel cell stack according to claim 4, wherein said reactant gas inlets, said reactant gas outlets, said intermediate reactant gas outlets, and said intermediate reactant gas inlets are defined through said unit cells in the stacking direction of said unit cells.

6. A fuel cell stuck according to claim 5, wherein said intermediate reactant gas outlet and said intermediate reactant gas inlet are defined in one side of said rectangular unit cells.

* * * * *